Patented July 4, 1950

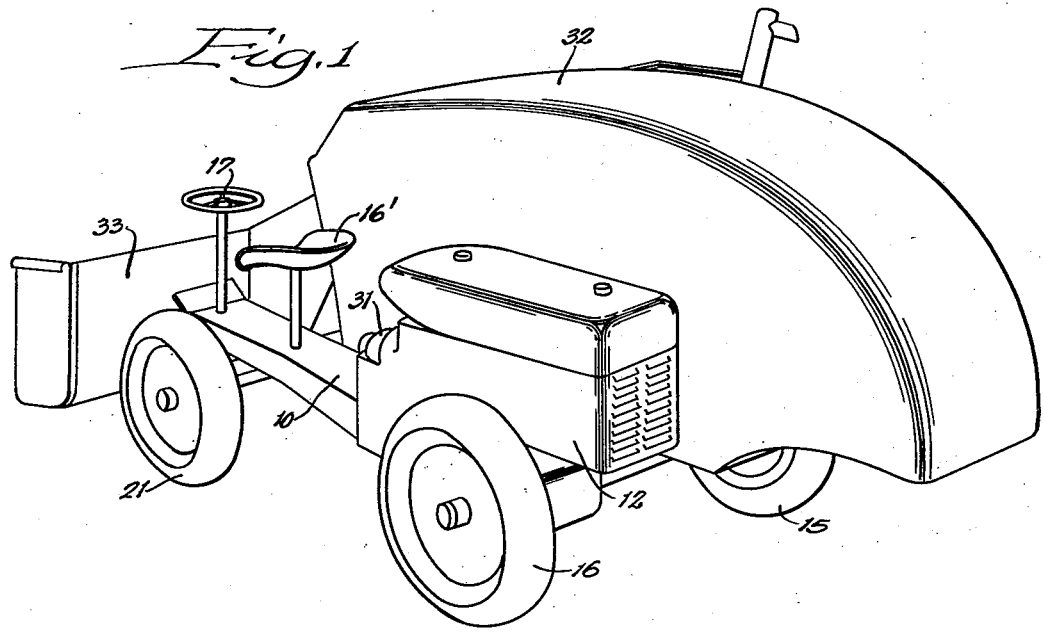
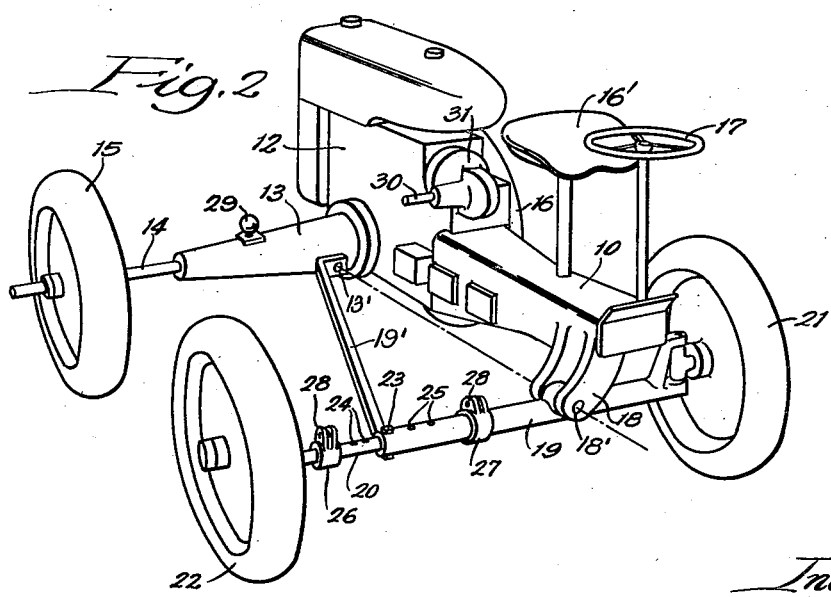

2,513,942

UNITED STATES PATENT OFFICE 2,513,942

HARVESTING POWER UNIT

Arnold E. W. Johnson, Oak Park, and David B. Baker, Riverside, Ill., and Charles F. Crumb, deceased, late of Clarendon Hills, Ill., by Helma Katherine Crumb, administratrix, Clarendon Hills, Ill., assignors to International Harvester Company, a corporation of New Jersey Continuation of application Serial No. 521,706, February 9, 1944. This application September 17, 1945, Serial No. 616,759

5 Claims. (Cl. 56—21)

This invention relates to a tractor. More specifically, it relates to a tractor particularly adapted for carrying implements such as harvester-threshers and other harvesting equipment.

This application is a continuation of application Serial No. 521,706, filed February 9, 1944, which has become abandoned.

In recent years there has been an extensive development of farm equipment of the tractor-mounted type of implements—that is, where a general-purpose tractor is provided which may pull implements or on which implements may be directly mounted. This development has been greatest for implements of lighter weight and smaller size such as cultivators and plows. To some extent, larger and heavier implements have been mounted directly on the tractors.

The principal object of the present invention is to provide an improved tractor construction so arranged that both space and weight-carrying capacity are provided for mounting large farm implements, such as harvester-threshers directly on the tractor.

Another object is to provide a tractor in which the power plant and operator's station are arranged to give the operator proper vision when implements are mounted on the tractor for operation thereby.

These objects and other objects which will be apparent from the detailed description to follow are accomplished by a construction such as shown in the drawings.

Figure 1 is a diagrammatic, perspective view of a tractor embodying the invention with a harvester-thresher mounted thereon; and Figure 2 is a perspective view showing the tractor alone.

As this invention resides in a general arrangement of parts, the drawings have been made both diagrammatic and perspective to better show the arrangement of the tractor parts which makes possible the provision of sufficient space, both lengthwise and laterally, for mounting large machines. The tractor consists essentially of a narrow, longitudinally-extending main frame or body 10, at the rear of which a conventional power plant in the form of a longitudinally positioned gasoline engine 12 is mounted. A transverse rear axle structure 13 is mounted on the frame in an offset relation; that is, the housing structure extends to one side of the frame structure a much greater distance than the housing structure at the other side. The long extension houses an extending drive axle 14, commonly referred to as a live axle, on which a traction wheel 15 is mounted for lateral adjustment. The traction wheel 16 is mounted at the short end of the axle structure. An operator's station is provided at the front of the frame structure 10, an operator's seat 16' and a steering wheel 17 being illustrated. It is to be understood that the essential controls for operating the tractor are to be provided adjacent the operator's station. A bracket structure 18 extends from the frame 10 downwardly and laterally in the direction of the center line of the tractor. Said bracket structure is pivoted at 18' to the front axle structure which includes a tubular member 19 and a shaft 20 telescopically received by the tubular member. A steerable wheel 21 is mounted on the frame end of the member 19 in alinement with the traction wheel 16. A steerable wheel 22 is mounted on the shaft 20. A bolt 23 holds the shaft and the tubular member against endwise movement and provides for adjustment by means of holes 24 formed in the shaft 20 and holes 25 provided in the member 19. By means of this adjustment and sliding of the rear traction wheel 15 on the live axle 14, the tread of the tractor may be varied.

As illustrative of means for securing the implements, brackets 26 and 27 have been shown, respectively, on the shaft 20 and the member 19. Said brackets have upwardly-extending apertured portions 28 to which similar attaching elements on the implement to be mounted may be secured. An attaching member 29 is shown on the rear axle formed with a ball attaching element which provides a universal connection for an implement on the rear axle structure. These three points provide mounting means which will permit pivoting movement of the front axle structure without twisting the frame structure of the implement mounted on the tractor.

To provide necessary strength in the front axle structure due to its unusual length at one side of the pivoting point on the frame, a brace 19' is provided. Said brace is connected to the outer end of the axle structure member 19 and extends to the rear axle structure to which it is pivoted at 13' on the same axis as the pivoting axis of the axle structure. This type of brace gives the axle rigidity without interfering with the tread adjustment.

The power plant 12 and the power transmission means are not illustrated and may be of any conventional type. As a part of the construction, a power take-off shaft 30 is illustrated as projecting laterally from a housing 31 through which power is transmitted from the tractor engine. This shaft is an ideal location for receiving power for driving implements mounted on the tractor which require a source of power. It is to be understood that a tractor as illustrated in Figure 2 is adapted to carry any type of implements, agricultural or other type, which may be suitably mounted in the space provided between the tractor body as formed by the frame and power plant, and the wheels at the opposite side of the tractor. The seat 16' is so located ahead of the power plant and adjacent the front of the tractor that an operator thereon is at an elevation sufficient to have a clear view not only at the forward end of the tractor but also between and behind the rear wheels. A harvester-thresher has been illustrated to show one large heavy machine which can be suitably mounted with the operator of the tractor being properly located for vision a full and unobstructed view to observe the action of the working parts of the harvester-thresher, particularly the cutting and pick-up mechanism which are located across the front of the tractor.

The harvester-thresher can be briefly described as including a crop treating thresher part 32 and a crop gathering harvester part 33. Said harvester part is located transversely of the tractor forwardly thereof, thereby providing a straight-through machine which may be operated in a field of grain without running over any uncut grain.

Other machines of various types may be mounted on the tractor, and any such mounting falling within the appended claims is contemplated as a part of the invention.

What is claimed is:

1. A tractor adapted for supporting implements comprising an extensible rear axle structure, a narrow frame extending forwardly from said structure adjacent one end thereof, a power plant and an operator's station on said frame, a front axle structure having a portion pivoted to the frame on a longitudinal axis adjacent one end of the axle structure, said axle structure including two relatively shiftable members, one member carrying the portion pivoted on the frame and carrying one of the front wheels, the other member extending laterally and carrying the other front wheel, and bracing means extending from the outer end of the member pivoted on the frame and to the rear axle structure, said bracing means being pivotally connected to the rear axle structure on the same longitudinal axis as the pivot axis of the front axle structure on the frame.

2. A tractor adapted for supporting agricultural machines comprising a wide tread rear axle structure, a wide tread front axle structure, a power plant mounted adjacent one end of the rear axle structure, a frame extending forwardly from said power plant, said frame being connected on a longitudinal pivot axis to a portion of the forward axle structure, adjacent one end thereof, an operator's station at the forward end of said frame ahead of the power plant, and a brace member extending from a point on the front axle structure, spaced from its pivot axis on the frame, to the rear axle structure, said member being pivoted to the rear axle structure on the same longitudinal axis as the pivot of the front axle structure on the frame, said power plant, frame and operator's station being mounted laterally of the center line of the vehicle whereby a space of substantial width is available the entire length of the tractor for the attachment of agricultural machines.

3. A self-propelled machine comprising a tractor having a rear axle structure, a front axle structure, a power plant mounted adjacent one end of the rear axle structure and occupying a portion of one side of the tractor and a side frame extending forwardly from said power plant, said frame being pivotally connected to the front axle structure, and an implement structure mounted on the front and rear axle structures and occupying the space between the power plant and the wheels at the other side of the tractor, said implement structure having a crop gathering part extending laterally across the tractor ahead of the front axle structure, and an operator's station ahead of the power plant and adjacent the front of the tractor above the crop gathering part whereby an operator seated thereon has full and unobstructed view of the crop gathering part during operation of the machine.

4. A self-propelled machine comprising a tractor having a rear axle structure, a front axle structure, a power plant mounted adjacent one end of the rear axle structure and a frame extending forwardly from said power plant, said frame being pivotally connected to the front axle structure, an implement structure removably mounted on the front and rear axle structures and occupying a portion of the space between the power plant and the wheels at the side of the tractor opposite the frame, and an operator's station located at the forward end of the tractor frame ahead of the power plant.

5. A self-propelled machine comprising a tractor having a rear axle structure, a front axle structure, a side frame extending forwardly from said rear axle structure at one side of the tractor, a power plant on said frame, said frame being pivotally connected to the front axle structure, an implement structure mounted on the front and rear axle structures and occupying the space between the frame and the wheels at the opposite side of the tractor, said implement structure having a crop gathering part extending laterally across the tractor ahead of the front axle structure, and an operator's station ahead of the power plant and adjacent the front of the tractor above the crop gathering part whereby an operator seated thereon has full and unobstructed view of the crop gathering part during operation of the machine.

ARNOLD E. W. JOHNSON.
DAVID B. BAKER.
HELMA KATHERINE CRUMB,
*Administratrix of the Estate of Charles F. Crumb, Deceased.*

REFERENCES CITED

The following references are of record in the file of this patent:

UNITED STATES PATENTS

| Number | Name | Date |
|---|---|---|
| 1,315,455 | Barby et al. | Sept. 9, 1919 |
| 1,566,229 | Scanlan | Dec. 15, 1925 |
| 1,599,196 | Baldwin | Sept. 7, 1926 |
| 1,665,684 | Burger et al. | Apr. 10, 1928 |
| 1,782,992 | Johnson | Nov. 25, 1930 |
| 2,020,271 | Winsor | Nov. 5, 1935 |
| 2,098,860 | Creech | Nov. 9, 1937 |
| 2,221,549 | Lindgren et al. | Nov. 12, 1940 |
| 2,262,876 | Baker et al. | Nov. 18, 1941 |
| 2,378,615 | Brown | June 19, 1945 |
| 2,413,355 | Johnson | Dec. 31, 1946 |
| 2,435,563 | Acton | Feb. 10, 1948 |

FOREIGN PATENTS

| Number | Country | Date |
|---|---|---|
| 167,042 | Great Britain | Mar. 7, 1921 |